Figure 1:
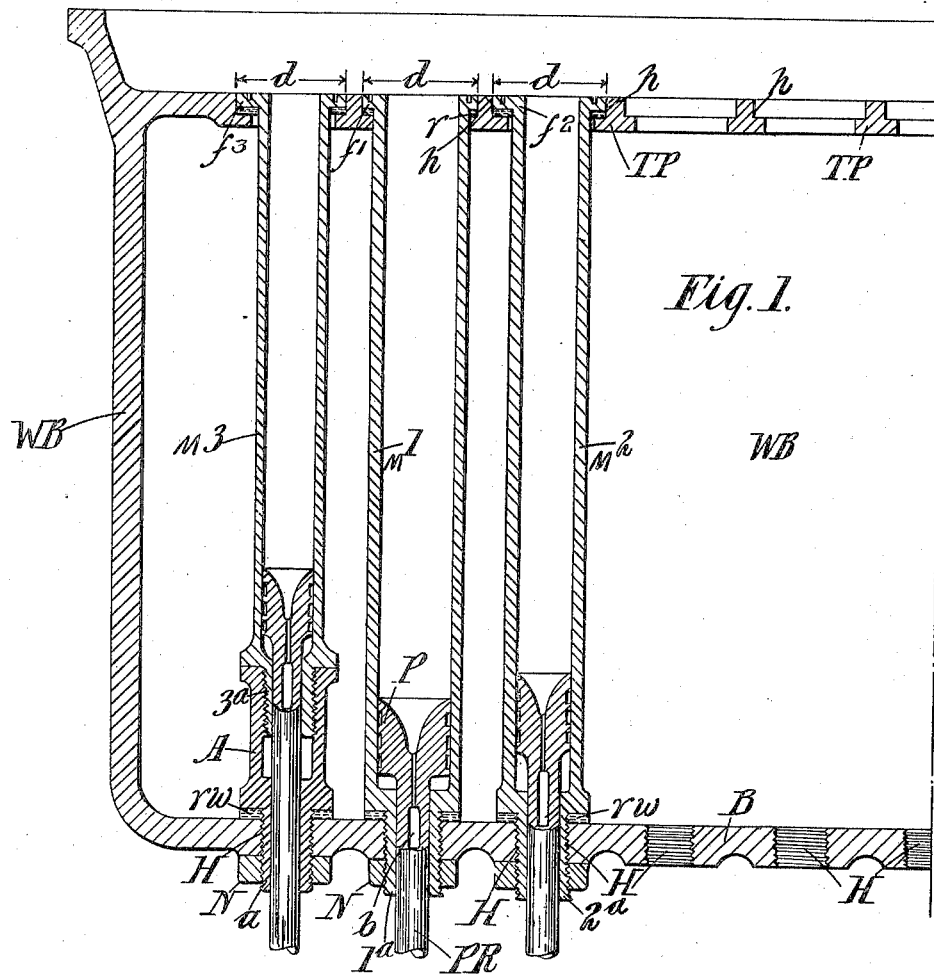

F. L. B. LOCKE.
MACHINE FOR THE MANUFACTURE OF CANDLES AND THE LIKE.
APPLICATION FILED SEPT. 30, 1918.

1,312,189.                                    Patented Aug. 5, 1919.

UNITED STATES PATENT OFFICE.

FRANK LOUIS BERTRAM LOCKE, OF HARPENDEN, ENGLAND.

MACHINE FOR THE MANUFACTURE OF CANDLES AND THE LIKE.

1,312,189.　　　　Specification of Letters Patent.　　Patented Aug. 5, 1919.

Application filed September 30, 1918. Serial No. 256,337.

*To all whom it may concern:*

Be it known that I, FRANK LOUIS BERTRAM LOCKE, a subject of the King of England, residing at Harpenden, in the county of Hertford, England, have invented certain new and useful Improvements in Machines for the Manufacture of Candles and the like, of which the following is a specification.

This invention relates to machines for the manufacture of candles or the like, for instance of night-lights, molded soaps, or blocks of molded edible fats. It is hereinafter described in relation to candle-molding machines, and it will be obvious from such description that its application to the molding of other articles can be carried out in like manner, except that the cross-section of the molds will be altered if desired, the shape of the pistons which fit in the molds being correspondingly altered.

Heretofore it has been customary in the molding of candles to employ a series of vertical tubular molds in a horizontal water-box; the molds have opened out on to the upper side of the upper plate of the water-box and have made a joint with the bottom of the water-box through which they have extended, a piston being provided within the mold, its rod extending out through the lower end thereof. Through this piston the wick has been led.

It has been customary to use with a given water-box one length and one diameter of mold only. For shorter molded articles it has been the custom to provide a correspondingly shallower water-box so that the shorter molds could make joint with the bottom of the box. For stouter, *i. e.* thicker, molded articles it has also been necessary to employ a different water-box with holes in the top plate altered in accordance with the alteration in diameter of the mold which had to be larger for an article of larger diameter.

The object of the present invention is to enable different lengths and diameters of mold within wide limits to be used with one and the same water-box so that a change in the size of the molded articles does not involve the use of a different machine but only the use of different molds and pistons in the same machine with the same water-box and with adapters, as hereinafter described, in the case of shorter molds.

The molds, of whatever different diameters they are made, are provided with a top flange of standard diameter to fit standard holes in the upper plate of the water-box. The longest molds employed make joint with the bottom of the box, in a manner well understood, and according to the present invention there is combined with any mold that is too short to reach down to the bottom of the box constructed for the longer molds, a tubular adapter which fits, just as a mold would fit, into the opening provided in the box-bottom for a longer mold, and extends upward from that opening into engagement with the lower end or the shorter mold and makes a joint with it through which the piston-rod passes. Thus the length and diameter of the molded article can be varied within wide limits without necessitating any alteration in the water-box, or in the rest of the machine, save in the molds and their pistons, and the employment of adapters when necessary.

Figure 2:
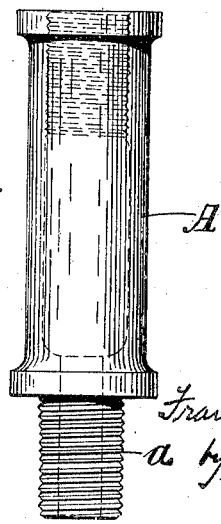

In the accompanying drawings,

Figure 1 illustrates in vertical central section through a row of molds, a water-box in which molds of different dimensions are placed according to the present invention, and Fig. 2 is a side elevation to a larger scale than that of Fig. 1 of one of the adapters A hereinafter referred to.

Like letters indicate like parts in both the figures.

WB is the water-box; TP is the top-plate thereof and B the bottom. The tubular mold M' is of the largest diameter and greatest length suited for use with this particular box. It has at its upper end a flange $f'$ the overall diameter of which is $d$, and this is received in a hole $h$ of corresponding diameter in the top-plate TP in which, underneath the flange $f'$, is a rubber washer $r$. The lower end $1^a$ of the mold 1 is reduced in diameter and screwed into a screw-threaded hole H in the bottom B of the water-box in which it is secured by a nut N. Through the reduced lower end of the mold passes the piston-rod PR of the piston P, which latter molds the tip of the candle. Through the bore $b$ of the hollow piston-rod PR passes the candle-wick. A rubber washer $rw$ is placed beneath the shoulder formed on the bottom of the mold where the screw-threaded portion meets it.

The mold $M^2$ is of smaller diameter than the mold $M^1$, but is otherwise similar. Although it is of smaller diameter, it possesses, like the mold $M^1$, a flange $f^2$ at its upper end of the same overall dimension $d$ to fit a standard hole $h$ in the top plate TP; thus the mold $M^2$ is used when candles of the same length but of smaller diameter than those to which the mold $M^1$ is adapted are to be made.

The mold $M^3$ is of smaller length as well as of smaller diameter than the mold $M^1$, but like the molds $M^1$ and $M^2$ it has a top flange $f^3$ of overall dimensions $d$ to fit a standard hole $h$ in the top plate TP. The lower end $3^a$ of the mold $M^3$ is reduced in diameter and screwthreaded like the lower ends $1^a$ and $2^a$ of the molds $M^1$ and $M^2$, but an adapter A is employed in combination with it. The lower end $a$ of this adapter is shaped like the lower ends $1^a$ and $2^a$ of the molds 1 and 2, and like these fits into a screwthreaded opening H provided in the bottom of the box for longer molds, and is similarly secured by a nut N; it extends upward from that opening and engages with the reduced lower end $3^a$ of the mold $M^3$ which is screwthreaded into the interior of the adapter as shown in Fig. 1.

If the length of the mold $M^3$ were other than that shown in the drawing, but not sufficient to enable the mold to reach down to the bottom of the water-box, it would be connected thereto by the use of an adapter A appropriately altered in length.

What I claim as my invention and desire to secure by Letters Patent is:—

1. In a molding machine of the character described, the combination with a water-box having two opposite walls each provided therethrough with an opening in alinement and with the other, of a tubular adapter having one end fitting into the opening provided in one of said walls, and a mold having one end fitting into the other end of said adapter and its other end fitting into the opening provided in the other of said walls.

2. In a molding machine of the character described, the combination with a water-box having two opposite walls each provided with openings of a common diameter therethrough, the openings in one of said walls being in alinement each with an opening in the other of said walls, of molds of different internal diameters secured each in an opening in one of said walls and fitting each into the opening in alinement therewith in the other of said walls.

3. In a molding machine of the character described, the combination with a water-box having two opposite walls each provided with openings of a common diameter therethrough, the openings in one of said walls being in alinement each with an opening in the other of said walls, of molds of different internal diameters secured each at one end in an opening in one of said walls and provided each at the other end with a flange of a common diameter fitting each into the opening in the other of said walls which is in alinement with the opening into which the other end is secured.

In testimony whereof I affix my signature.

FRANK LOUIS BERTRAM LOCKE.

Copies of this patent may be obtained for five cents each, by addressing the "Commissioner of Patents, Washington, D. C."